(12) United States Patent
Martin et al.

(10) Patent No.: US 10,491,341 B2
(45) Date of Patent: Nov. 26, 2019

(54) TELECOMMUNICATION DEVICES AND METHODS FOR PERFORMING DATA RETRANSMISSION IN A TELECOMMUNICATIONS SYSTEM

(71) Applicant: SONY CORPORATION, Tokyo (JP)

(72) Inventors: Brian Alexander Martin, Basingstoke (GB); Martin Warwick Beale, Basingstoke (GB)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/552,954

(22) PCT Filed: Feb. 23, 2016

(86) PCT No.: PCT/EP2016/053737
§ 371 (c)(1),
(2) Date: Aug. 23, 2017

(87) PCT Pub. No.: WO2016/146347
PCT Pub. Date: Sep. 22, 2016

(65) Prior Publication Data
US 2018/0048433 A1 Feb. 15, 2018

(30) Foreign Application Priority Data
Mar. 17, 2015 (EP) ..................... 15159522

(51) Int. Cl.
*H04L 1/18* (2006.01)
*H04L 1/22* (2006.01)

(52) U.S. Cl.
CPC .......... *H04L 1/1887* (2013.01); *H04L 1/1893* (2013.01); *H04L 1/22* (2013.01); *H04L 1/188* (2013.01)

(58) Field of Classification Search
CPC ....... H04L 1/1887; H04L 1/1893; H04L 1/22; H04L 1/188
See application file for complete search history.

(56) References Cited

U.S. PATENT DOCUMENTS

| | | |
|---|---|---|
| 2012/0320853 A1 | 12/2012 | Kwon et al. |
| 2012/0327783 A1 | 12/2012 | Moon et al. |
| 2015/0036600 A1 | 2/2015 | Hong |

FOREIGN PATENT DOCUMENTS

EP 3094032 A1 * 11/2016 ............ H04W 16/14

OTHER PUBLICATIONS

Harri Holma, et al., "LTE for UMTS OFDMA and SC-FDMA Based Radio Access," Wiley 2009, ISBN 978-0-470-99401-6, 2009, (4 pages).

(Continued)

*Primary Examiner* — Jackie Zuniga Abad
(74) *Attorney, Agent, or Firm* — Xsensus LLP

(57) ABSTRACT

Communicating data in a wireless telecommunications system, the system comprising a base station and one or more terminals operable to communicate via a wireless interface and in accordance with a mobile communication protocol, the wireless interface being provided by at least a first component carrier within a first frequency band and a second component carrier within a second frequency band. The method comprising transmitting a link control layer Packet Data Unit "PDU" from a link control module to an access control layer module for transmission; transmitting first access control layer data using resources allocated within the first component carrier; identifying that transmission of data for the PDU has been unsuccessful; and upon identification that transmission of data for the PDU has been unsuccessful, re-transmitting the PDU and causing the re-transmitted PDU to be transmitted via second access control (Continued)

layer data using resources allocated within the second component carrier.

20 Claims, 6 Drawing Sheets

(56) References Cited

OTHER PUBLICATIONS

"Technical Specification LTE; Evolved Universal Terrestrial Radio Access (E-UTRA); Physical channels and modulation (3GPP TS 36.211 version 12.4.0 Release 12)," ETSI TS 136 211 V12.4.0, Feb. 2015, (126 pages).

"Technical Specification LTE; Evolved Universal Terrestrial Radio Access (E-UTRA); Multiplexing and channel coding (3GPP TS 36.212 version 12.3.0 Release 12)," ETSI TS 136 212 V12.3.0, Feb. 2015, (91 pages).

"Technical Specification LTE; Evolved Universal Terrestrial Radio Access (E-UTRA); Physical layer procedures (3GPP TS 36.213 version 12.4.0 Release 12)," ETSI TS 136 213 V12.4.0, Feb. 2015, (227 pages).

"Technical Specification LTE; Evolved Universal Terrestrial Radio Access (E-UTRA); Medium Access Control (MAC) protocol specification (3GPP TS 36.321 version 12.4.0 Release 12)," ETSI TS 136 321 V12.4.0, Feb. 2015, (62 pages).

"Technical Specification LTE; Evolved Universal Terrestrial Radio Access (E-UTRA); Radio Resource Control (RRC); Protocol specification (3GPP TS 36.331 version 12.4.1 Release 12)," ETSI TS 136 331 V12.4.1, Feb. 2015, (415 pages).

R2-150188, "Overview of possible LAA impact to RAN2," Nokia Corporation, Nokia Networks, 3GPP TSG-RAN WG2 Meeting #89, Feb. 2015, (8 pages).

RP-141664 revision of RP141646, "Study on Licensed-Assisted Accessing using LTE," Ericsson, Qualcomm, Huawei, Alcatel-Lucent, 3GPP TSG RAN Meeting #65, Sep. 2014, (8 pages).

"Technical Specification LTE; Evolved Universal Terrestrial Radio Access (E-UTRA); Radio Link Control (RLC) protocol specification (3GPP TS 36.322 version 12.1.1 Release 12)," ETSI TS 136 322 V12.1.1, Feb. 2015, (43 pages).

International Search Report dated May 13, 2016 in PCT/EP2016/053737 filed Feb. 23, 2016.

European Communication dated Jul. 26, 2019 in European Application No. 16 706 339.5.

Kyocera: "HARQ retransmissions on LAA", 3GPP Draft; R2-150268_LAA, 3rd Generation Partnership Project (3GPP), vol. RAN WG2, Feb. 8, 2015 (Feb. 8, 2015), XP050935593, Retrieved from the Internet: URL: http://www.3gpp.org/ftp/Meetings_3GPP _SYNC/RAN2/Docs/ [retrieved on Feb. 8, 2015].

Panasonic: "Discussion on charging aspect in LAA", 3GPP Draft; R1-144803, 3rd Generation Partnership Project (3GPP), vol. RAN WG1, Nov. 8, 2014 (Nov. 8, 2014), XP050895489, Retrieved from the Internet: URL:http://www.3gpp.org/ftp/tsg_ran/WG1_RL 1/TSGR1_79/Docs/ [retrieved on Nov. 8, 2014].

* cited by examiner

TELECOMMUNICATION DEVICES AND METHODS FOR PERFORMING DATA RETRANSMISSION IN A TELECOMMUNICATIONS SYSTEM

CROSS-REFERENCE TO RELATED APPLICATIONS

This application is a National Stage of International Application No. PCT/EP2016/053737, filed Feb. 23, 2016, which claims priority to European Patent Application 15 159 522.0, filed in the European Patent Office on Mar. 17, 2015, the entire contents of which is being incorporated herein by reference.

TECHNICAL FIELD OF THE DISCLOSURE

The present disclosure relates to telecommunication devices and methods for communicating data in a telecommunication system, and is applicable but not limited to communications devices which are configured to perform data retransmission.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention. It is well known in the field of wireless telecommunications for regions of the radio spectrum to be assigned to different mobile network operators (MNO) for their exclusive use through a license. A license typically grants an MNO exclusive use over a number of years of a predefined portion of the radio frequency spectrum in which to deploy a mobile communications network (e.g. GSM, WCDMA/HSPA, LTE/LTE-A). As a result of this approach, an operator has guarantees of no other radio services interfering with the radio resources that have been assigned to the operator, and within the limitations of the license conditions it has exclusive control over what radio technology it deploys in the network. Consequently, a wireless telecommunications system that is primarily designed to operate using radio resources that have been licensed for exclusive use by the wireless telecommunications system can operate with a degree of centralised control and coordination to help make most efficient use of the available radio resources. Such a wireless telecommunication system also manages all the interference internally, based on standard specifications, since the license grants it good immunity from external interference sources. Coexistence of different devices deployed on an MNO's licensed band is managed through conformance to relevant radio standards. Licensed spectrum is today usually assigned to operators via government-organised auctions, but so-called "beauty contests" continue also to be in use.

It is also well known in the field of wireless telecommunications for regions of the available radio spectrum to remain unlicensed. Unlicensed (license exempt) radio spectrum may, at least to some extent, be freely used by a number of different technologies, such as Wi-Fi and Bluetooth and other non-3GPP radio access technologies. Operating parameters for devices using unlicensed spectrum bands are typically stipulated by technical regulatory requirements such as e.g. the FCC Part 15 rule for 2.4 GHz ISM band. Coexistence of different devices deployed on unlicensed band, due to the lack of centralised coordination and control, is usually based on such technical rules and various politeness protocols.

The use of wireless telecommunications system technologies designed for operation on licensed radio spectrum, such as LTE, is becoming more and more prevalent, both in terms of increasing take-up of established uses for wireless telecommunications technologies, and also the introduction of new uses, e.g., in the developing field of machine-type communications (MTC). In order to help provide more bandwidth to support this increased use of wireless telecommunications technologies, it has recently been proposed to use unlicensed radio spectrum resources to support operations on licensed radio spectrum. The use of unlicensed radio spectrum in LTE is sometimes referred to as LTE-A or LTE-LAA or LAA-LTE (LAA standing for "Licensed-Assisted Access").

However, in contrast to licensed spectrum, unlicensed spectrum can be shared and used among different technologies, or different networks using the same technology, without any co-ordinated/centralised control, for example to provide protection against interference. As a consequence of this, the use of wireless technologies in unlicensed spectrum can be subject to unpredictable interference and has no guarantees of spectrum resources, i.e. the radio connection takes place on a best effort basis. This means that wireless network technologies, such as LTE, which are generally designed to operate using licensed radio resources, require modified approaches to allow them to efficiently use unlicensed radio resources, and in particular to co-exist reliably and fairly with other radio access technologies that may be simultaneously operating in the unlicensed spectrum band.

Therefore, deploying a mobile radio access technology system primarily designed to operate in licensed spectrum bands (i.e. having exclusive access to, and hence a level of control over, the relevant radio resources) in a manner which is required by operation in unlicensed spectrum bands (i.e. without having exclusive access to at least some of the relevant radio resources), gives rise to new technical challenges.

SUMMARY OF THE DISCLOSURE

According to a first example embodiment of the present technique there is provided a method of communicating data in a wireless telecommunications system, the system comprising a base station and one or more terminals operable to communicate via a wireless interface and in accordance with a mobile communication protocol, the wireless interface being provided by at least a first component carrier within a first frequency band and a second component carrier within a second frequency band. The method comprises: transmitting a link control layer Packet Data Unit "PDU" from a link control module to an access control layer module for transmission, the link control layer being at a higher layer than the access control layer; transmitting first access control layer data using resources allocated within the first component carrier, wherein the first access control layer data corresponds to the PDU; identifying that transmission of data for the PDU has been unsuccessful; and upon identification that transmission of data for the PDU has been unsuccessful, the link control module re-transmitting the PDU and causing the re-transmitted PDU to be transmitted via second access control layer data using resources allocated within the second component carrier.

According to a further example embodiment of the present technique there is provided a telecommunication device for communicating data in a wireless telecommunications system, the system comprising a base station and one or more terminals operable to communicate via a wireless interface and in accordance with a mobile communication protocol, the wireless interface being provided by at least a first component carrier within a first frequency band and a second component carrier within a second frequency band. The telecommunication device comprises a link control module at a link control layer and an access control layer module at an access control layer, the link control layer being at a higher layer than the access control layer. The telecommunication device is configured to: transmit, from the link control module to the access control layer module, a link control layer Packet Data Unit "PDU" for transmission; transmit first access control layer data using resources allocated within the first component carrier, wherein the first access control layer data corresponds to the PDU; identify that transmission of data for the PDU has been unsuccessful; and upon identification that transmission of data for the PDU has been unsuccessful, re-transmit, from the link control module, the PDU and cause the re-transmitted PDU to be transmitted via second access control layer data using resources allocated within the second component carrier.

According to another example embodiment of the present technique there is provided circuitry for a telecommunication device communicating data in a wireless telecommunications system, the system comprising a base station and one or more terminals operable to communicate via a wireless interface and in accordance with a mobile communication protocol, the wireless interface being provided by at least a first component carrier within a first frequency band and a second component carrier within a second frequency band. The circuitry comprises a controller element and a transceiver element configured to operate together to: transmit, from a link control module to an access control layer module, a link control layer Packet Data Unit "PDU" for transmission, the link control layer being at a higher layer than the access control layer; transmit first access control layer data using resources allocated within the first component carrier, wherein the first access control layer data corresponds to the PDU; identify that transmission of data for the PDU has been unsuccessful; and upon identification that transmission of data for the PDU has been unsuccessful, re-transmit, from the link control module, the PDU and cause the re-transmitted PDU to be transmitted via second access control layer data using resources allocated within the second component carrier.

Example embodiments of the present technique can provide an arrangement for mobile communication wherein the frequency resources used for retransmitting data can be changed compared to the frequency resources originally used for sending the data.

Various further aspects and features of the present disclosure are defined in the appended claims and include a telecommunications device, a method of communicating data and circuitry for a telecommunication device.

BRIEF DESCRIPTION OF DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
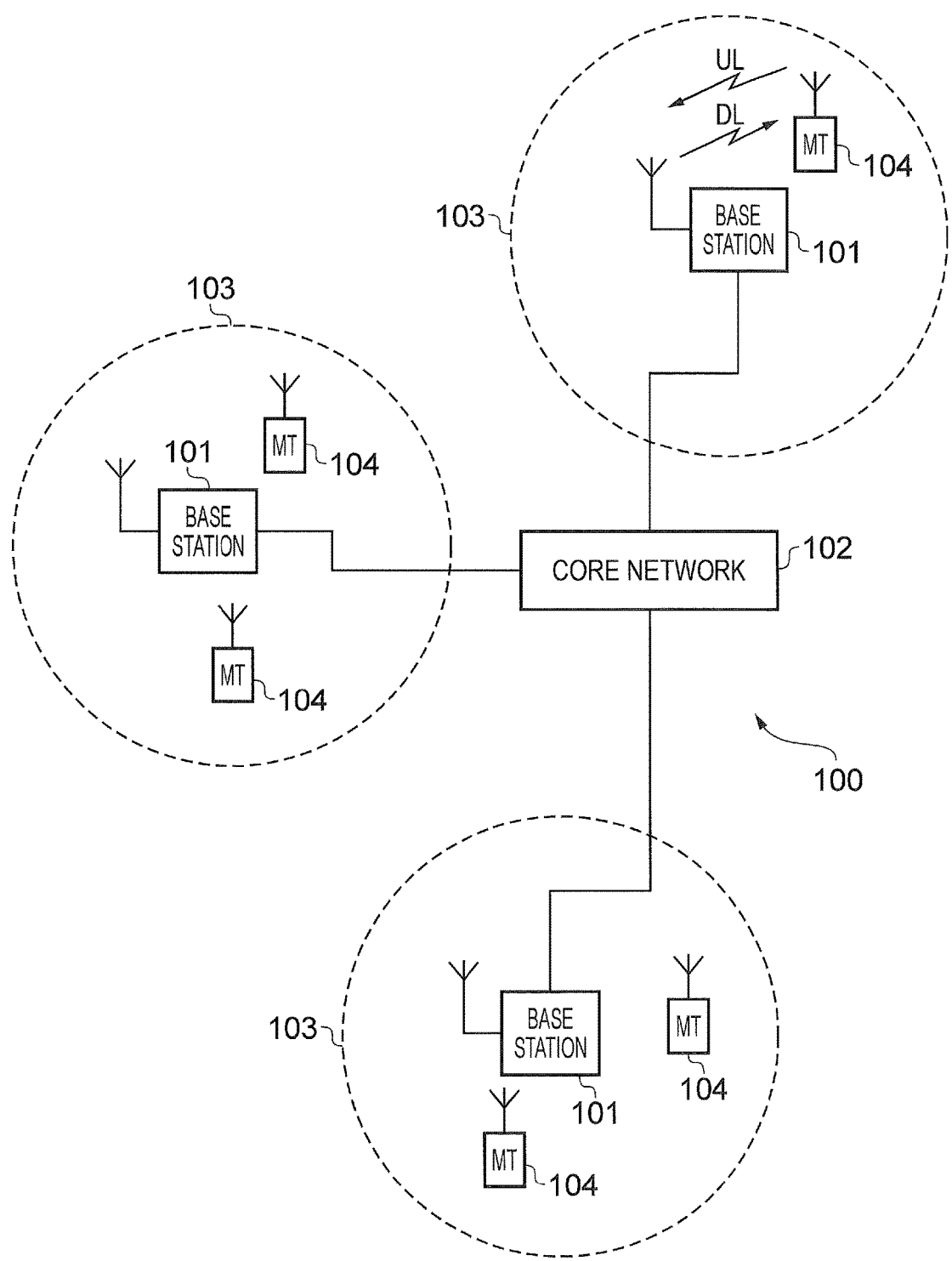
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licensed for use by the operator of the network 100. The core network 102 routes data to and from the terminal devices 104 via the respective base stations 101 and provides functions such as authentication, mobility management, charging and so on. Terminal devices may also be referred to as mobile stations, user equipment (UE), user terminal, terminal, mobile radio, and so forth. Base stations may also be referred to as transceiver stations/nodeBs/e-nodeBs, and so forth.

Figure 2:
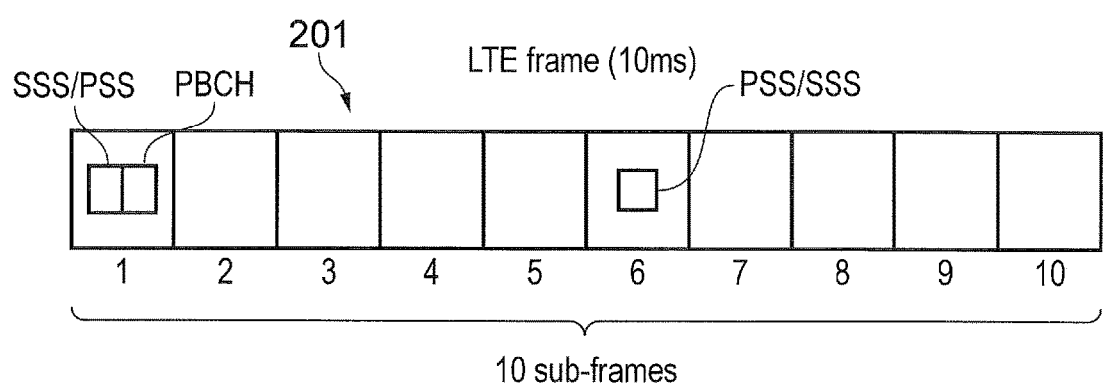
FIG. 2 provides a schematic diagram illustrating a LTE radio frame.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS)

and a secondary synchronisation signal (SSS) are transmitted in the first and sixth subframes of the LTE frame. A physical broadcast channel (PBCH) is transmitted in the first subframe of the LTE frame.

Figure 3:
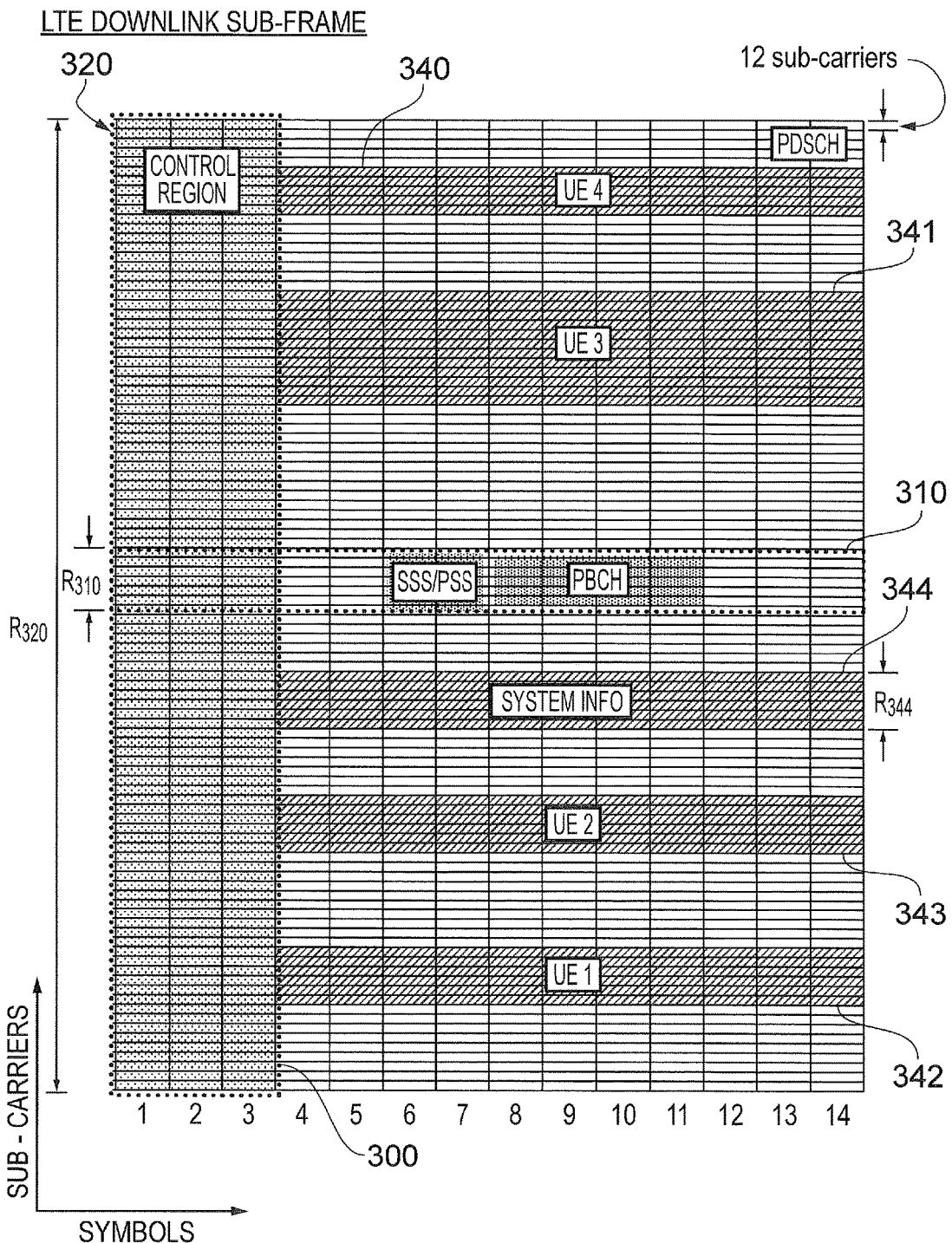
FIG. 3 provides a schematic diagram illustrating an example of a LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth licensed for use by the operator of the network 100, and this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 342 for a first LTE terminal (UE 1) extends over five blocks of twelve subcarriers (i.e. 60 subcarriers), the resource allocation 343 for a second LTE terminal (UE2) extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The control data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated to specific terminals (or all terminals or subset of terminals). This may be referred to as physical-layer control signalling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of R344. A conventional LTE subframe will also include reference signals which are not shown in FIG. 3 in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity.

The communications between the base stations 101 and the terminal devices 104 are conventionally made using radio resources that have been licensed for exclusive use by the operator of the network 100. These licensed radio resources will be only a portion of the overall radio spectrum. Other devices within the environment of the network 100 may be wirelessly communicating using other radio resources. For example, a different operator's network may be operating within the same geographical region using different radio resources that have been licensed for use by the different operator. Other devices may be operating using other radio resources in an unlicensed radio spectrum band, for example using Wi-Fi or Bluetooth technologies.

As noted above, it has been proposed that a wireless telecommunications network using radio resources in a licensed portion of the radio spectrum might be supported by using radio resources in an unlicensed portion of the radio spectrum (i.e. a portion of the radio spectrum over which the wireless telecommunications network does not have exclusive access, but rather which is shared by other access technologies and/or other wireless telecommunications networks). In particular, it has been proposed that carrier aggregation based techniques may be used to allow unlicensed radio resources to be used in conjunction with licensed radio resources.

In essence, carrier aggregation allows for communications between a base station and a terminal device to be made using more than one carrier. This can increase the maximum data rate that may be achieved between a base station and a terminal device as compared to when using only one carrier and can help enable more efficient and productive use of fragmented spectrum. Individual carriers that are aggregated are commonly referred to as Component Carriers (or sometimes simply components). In the context of LTE, carrier aggregation was introduced in Release 10 of the standard. In accordance with the current standards for carrier aggregation in an LTE-based system, up to five component carriers can be aggregated for each of downlink and uplink. The component carriers are not required to be contiguous with one another and can have a system bandwidth corresponding to any of the LTE-defined values (1.4 MHz, 3 MHz, 5 MHz, 10 MHz, 15 MHz and 20 MHz), thereby allowing a total bandwidth of up to 100 MHz. Of course it will be appreciated this is just one example of a specific carrier aggregation implementation and other implementations may allow for different numbers of component carriers and/or bandwidths.

Further information on the operation of carrier aggregation in the context of LTE-based wireless telecommunications systems can be found in the relevant standards documents, such as

[2] 3GPP TS 36.211 version 12.4.0 Release 12;
[3] 3GPP TS 36.212 version 12.3.0 Release 12;
[4] 3GPP TS 36.213 version 12.4.0 Release 12;
[5] 3GPP TS 36.321 version 12.4.0 Release 12; and
[6] 3GPP TS 36.331 version 12.4.1 Release 12.

In accordance with the terminology and implementation used for carrier aggregation in the context of an LTE-based system, a cell is denoted the 'primary cell', or Pcell, for a terminal device if it is the cell that is initially configured during connection setup for the terminal device. Thus the primary cell handles RRC (radio resource control) connection establishment/re-establishment for the terminal device. The primary cell is associated with a downlink component carrier and an uplink component carrier (CoC). These may sometimes be referred to herein as primary component carriers. A cell that is configured for use by the terminal device after initial connection establishment on the Pcell is termed a 'secondary cell', or Scell. Thus the secondary cells are configured after connections establishment to provide additional radio resources. The carriers associated with Scells may sometimes be referred to herein as secondary component carriers. Since in the current LTE system up to five component carriers can be aggregated, up to four Scells (correspondingly associated with up to four secondary component carriers) can be configured for aggregation with the primary cell (associated with the primary component carrier). In other systems, the maximum number of component carriers that can be aggregated can be fewer or more than five. An Scell might not have both a downlink and uplink component carrier and the association between uplink component carriers and downlink component carriers is signalled in SIB2 on each downlink component carrier. The primary cell supports PDCCH and PDSCH on downlink and PUSCH and PUCCH on uplink whereas the secondary cell(s) support PDCCH and PDSCH on downlink and PUSCH on uplink, but not PUCCH. Measurement and mobility procedures are handled on the Pcell and the Pcell cannot be deactivated. The Scell(s) may be dynamically activated and deactivated, for example according to traffic needs, though MAC layer signalling to the terminal device. An Scell for a terminal device may also be deactivated automatically (time out) if the terminal device does not receive any transmission resource allocations on the Scell for a threshold amount of time.

Some aspects of physical layer control signalling for an LTE-based implementation of carrier aggregation based on the current standards are now described.

Each downlink component carrier has the normal LTE control channels: (E)PDCCH, PCFICH and PHICH. However, carrier aggregation introduces the possibility of so-called cross-carrier scheduling (XCS) on PDCCH. To support cross-carrier scheduling, a downlink control information (DCI) message on PDCCH includes a carrier indicator field (CIF) comprising three bits to indicate which of the component carriers the PDCCH message applies to. If there is no CIF, the PDCCH is treated as applying to the carrier on which it is received. A motivation for providing cross-carrier scheduling primarily applies for heterogeneous network (het-net) scenarios where overlaid macro- and small-cells may operate carrier aggregation in the same band. The effects of interference between the respective macro- and small-cells' PDCCH signalling can be mitigated by having the macro-cell transmit its PDCCH signalling on one component carrier at relatively high transmit power (to provide coverage across the macro-cell), while the small-cells use an alternative component carrier for their PDCCH scheduling.

The control region supporting PDCCH may differ in size (i.e. number of OFDM symbols) between component carriers, so they can carry different PCFICH values. However, the potential for interference in the control region in a het-net implementation may mean that PCFICH cannot be decoded on a particular component carrier. Therefore, current LTE standards allow for each component to carrier a semi-static indication of which OFDM symbol PDSCH can be assumed to begin in each subframe. If fewer OFDM symbols are actually used for the control region, the free/spare OFDM symbol(s) may be used for PDSCH transmissions to terminal devices which are not being cross-carrier scheduled as they will decode the actual PCFICH. If more OFDM symbols are actually used for the control region, there will be some degree of performance degradation for the cross-carrier scheduled terminal devices.

PHICH signalling is sent on the downlink component carrier that sent the PDCCH signalling containing the PUSCH allocation to which the PHICH signalling relates. Accordingly, one downlink component carrier may carry PHICH for more than one component carrier.

In the uplink, the basic operation of PUCCH is not altered by the introduction of carrier aggregation. However, a new PUCCH format (format 3) is introduced to support the sending of acknowledgement signalling (ACK/NACK signalling) for multiple downlink component carriers, and with some alterations to format 1b to increase the number of ACK/NACK bits it can carry.

In current LTE-based carrier aggregation scenarios, primary and secondary synchronisation signalling (PSS and SSS) are transmitted on all component carriers using the same physical-layer cell identity (PCI) and component carriers are all synchronised with one another. This can help with cell search and discovery procedures. Issues relating to security and system information (SI) are handled by the Pcell. In particular, when activating an Scell, the Pcell delivers the relevant SI for the Scell to the terminal device using dedicated RRC signalling. If the system information relating to a Scell changes, the Scell is released and re-added by Pcell RRC signalling (in one RRC message). Pcell changes, e.g. due to long-term fluctuations in channel quality across the Pcell bandwidth, are handled using a modified handover procedure. The source Pcell passes all the relevant carrier aggregation (CA) information to the target Pcell so the terminal device can begin to use all the assigned component carriers when handover is complete.

Random access procedures are primarily handled on the uplink component carrier of Pcell for a terminal device, although some aspects of contention resolution signalling may be cross-carrier scheduled to another serving cell (i.e. an Scell).

As noted above, carrier aggregation is one approach for making use of unlicensed radio spectrum resources in wireless communication networks which are primarily designed to use licensed radio spectrum. In broad summary, a carrier aggregation based approach may be used to configure and operate a first component carrier (e.g. a primary component carrier associated with a Pcell in LTE terminology) within a region of the radio spectrum that has been licensed for use by a wireless telecommunications network, and to also configure and operate one or more further component carriers (e.g. a secondary component carrier associated with an Scell in LTE terminology) in an unlicensed region of the radio spectrum. The secondary component carrier(s) operating in the unlicensed region of the radio spectrum may do so in an opportunistic manner by making use of the unlicensed radio resources when they are available. There may also be provisions made for restricting the extent to which a given operator can make use of the unlicensed radio resources, for example by defining what might be referred to as politeness protocols.

Although known carrier aggregation schemes can form a basis for using unlicensed radio spectrum resources (or other forms of shared radio resources) in conjunction with licensed radio spectrum resources, some modifications to known carrier aggregation techniques may be appropriate to help optimise performance. This is because radio interference in the unlicensed radio spectrum can be expected to be subject to a wider range of unknown and unpredictable variations in time and frequency than might be seen within a region of the radio spectrum which has been licensed for use by a particular wireless applications system. For a given wireless telecommunications system operating in accordance with a given technology, such as LTE-A, interference in the unlicensed radio spectrum may arise from other systems operating according to the same technology, or systems operating according to different technologies, such as Wi-Fi or Bluetooth.

Figure 4:
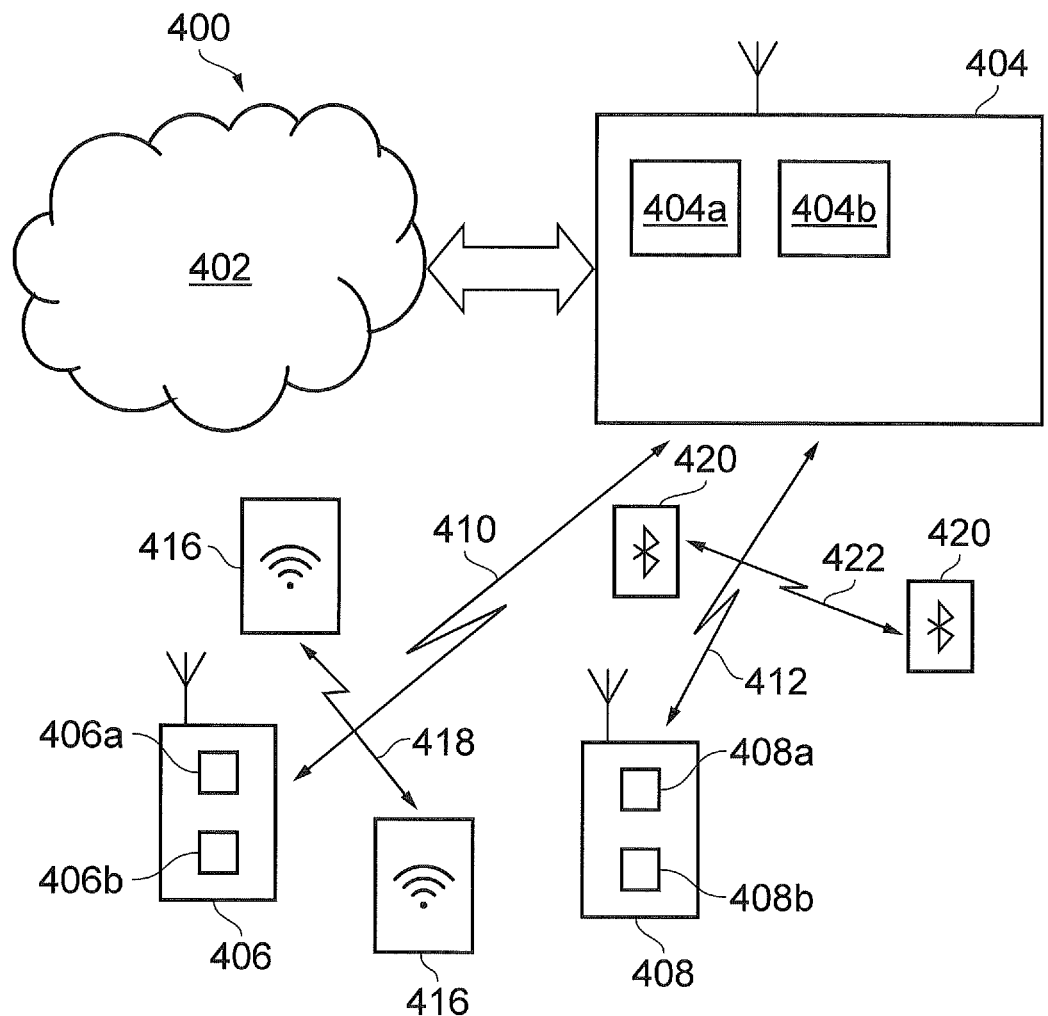
FIG. 4 schematically represents an example wireless telecommunications system.

FIG. 4 schematically shows a telecommunications system 400 according to an embodiment of the disclosure. The telecommunications system 400 in this example is based broadly on a LTE-type architecture. As such many aspects of the operation of the telecommunications system 400 are standard and well understood and not described here in detail in the interest of brevity. Operational aspects of the telecommunications system 400 which are not specifically described herein may be implemented in accordance with any known techniques, for example according to the established LTE-standards and known variations thereof.

The telecommunications system 400 comprises a core network part (evolved packet core) 402 coupled to a radio network part. The radio network part comprises a base station (evolved-nodeB) 404, a first terminal device 406 and a second terminal device 408. It will of course be appreciated that in practice the radio network part may comprise a plurality of base stations serving a larger number of terminal devices across various communication cells. However, only a single base station and two terminal devices are shown in FIG. 4 in the interests of simplicity.

Although not part of the telecommunications system 400 itself, also shown in FIG. 4 are some other devices which are operable to wirelessly communicate with one another and which are operating within the radio environment of the telecommunications system 400. In particular, there is a pair of wireless access devices 416 communicating with one another via radio link 418 operating in accordance with a Wi-Fi standard and a pair of Bluetooth devices 420 communicating with one another via radio link 422 operating in accordance with a Bluetooth standard. These other devices represent a potential source of radio interference for the telecommunications system 400. It will be appreciated that in practice there will typically be many more such devices operating in the radio environment of the wireless telecommunications system 400, and only two pairs of devices 416, 418 are shown in FIG. 4 for simplicity.

As with a conventional mobile radio network, the terminal devices 406, 408 are arranged to wirelessly communicate data to and from the base station (transceiver station) 404. The base station is in turn communicatively connected to a serving gateway, S-GW, (not shown) in the core network part which is arranged to perform routing and management of mobile communications services to the terminal devices in the telecommunications system 400 via the base station 404. In order to maintain mobility management and connectivity, the core network part 402 also includes a mobility management entity (not shown) which manages the enhanced packet service, EPS, connections with the terminal devices 406, 408 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 402 to an external packet data network, for example the Internet. As noted above, the operation of the various elements of the communications system 400 shown in FIG. 4 may be broadly conventional apart from where modified to provide functionality in accordance with embodiments of the disclosure as discussed herein.

The terminal devices 406, 408 each comprise a transceiver unit 406a, 408a for transmission and reception of wireless signals and a controller unit 406b, 408b configured to control the operation of the respective devices 406, 408 in accordance with embodiments of the disclosure. The respective controller units 406b, 408b may each comprise a processor unit which is suitably configured/programmed to provide the desired functionality described herein using conventional programming/configuration techniques for equipment in wireless telecommunications systems. For each of the terminal devices 406, 408, their respective transceiver units 406a, 408a and controller units 406b, 408b are schematically shown in FIG. 4 as separate elements for ease of representation. However, it will be appreciated that for each terminal device the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminal devices 406, 408 will in general comprise various other elements associated with their operating functionality in accordance with established wireless telecommunications techniques (e.g. a power source, possibly a user interface, and so forth).

As has become commonplace in the field of wireless telecommunications, terminal devices may support Wi-Fi and Bluetooth functionality in addition to cellular/mobile telecommunications functionality. Thus the transceiver units 406a, 408a of the respective terminal devices may comprise functional modules operable according to different wireless communications operating standards. For example, the terminal devices' transceiver units may each comprise an LTE transceiver module for supporting wireless communications in accordance with an LTE-based operating standard, a WLAN transceiver module for supporting wireless communications in accordance with a WLAN operating standard (e.g. a Wi-Fi standard), and a Bluetooth transceiver module for supporting wireless communications in accordance with a Bluetooth operating standard. The underlying functionality of the different transceiver modules may be provided in accordance with conventional techniques. For example, a terminal device may have separate hardware elements to provide the functionality of each transceiver module, or alternatively, a terminal device might comprise at least some hardware elements which are configurable to provide some or all functionality of multiple transceiver modules. Thus the transceiver units 406a, 408a of the terminal devices 406, 408 represented in FIG. 4 are assumed here to provide the functionality of an LTE transceiver module, a Wi-Fi transceiver module and a Bluetooth transceiver module in accordance with conventional wireless communications techniques.

The base station 404 comprises a transceiver unit 404a for transmission and reception of wireless signals and a controller unit 404b configured to control the base station 404. The controller unit 404b may comprise a processor unit which is suitably configured/programmed to provide the desired functionality described herein using conventional programming/configuration techniques for equipment in wireless telecommunications systems. The transceiver unit 404a and the controller unit 404b are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 404 will in general comprise various other elements associated with its operating functionality. For example, the base station 404 will in general comprise a scheduling entity responsible for scheduling communications. The functionality of the scheduling entity may, for example, be subsumed by the controller unit 404b.

Thus, the base station 404 is configured to communicate data with the first and second terminal devices 406, 408 over respective first and second radio communication links 410, 412. The wireless telecommunications system 400 supports a carrier aggregation mode of operation in which the first and second radio communication links 410, 412 each comprise a wireless access interface provided by multiple component carriers. For example, each radio communication link may comprise a primary component carrier and one or more secondary component carriers. Furthermore, the elements comprising the wireless telecommunications system 400 in accordance with this embodiment of the disclosure are assumed to support carrier aggregation in an unlicensed spectrum mode. In this unlicensed spectrum mode the base station communicates with terminal devices using a primary component carrier operating on radio resources within a first frequency band that has been licensed for use by the wireless telecommunications system and one or more secondary component carriers operating on radio resources within a second frequency band that has not been licensed for exclusive use by the wireless telecommunications system. The first frequency band may sometimes be referred to herein as a licensed frequency band and the second frequency band may sometimes be referred to herein as an unlicensed (U) frequency band. In the context of an LTE-based wireless telecommunications system, such as that represented in FIG. 4, operation in the unlicensed frequency band may be referred to as an LTE-U mode of operation. The first (licensed) frequency band may be referred to as an LTE band (or more particularly an LTE-A band) and the second (unlicensed) frequency band may be referred to as an LTE-U band. Resources on the LTE-U band may be referred to as U-resources. A terminal device able to make use of U-resources may be referred to as a U-terminal device (or U-UE). More generally, the qualifier "U" may be used herein to conveniently identify operations in respect of the unlicensed frequency band.

It will be appreciated that the use of carrier aggregation techniques and the use of unlicensed spectrum resources (i.e. resources that may be used by other devices without centralised coordination) in accordance with embodiments of the disclosure may be based generally on previously proposed principles for such modes of operation, for example as discussed above, but with modifications as described herein to provide additional functionality in accordance with embodiments of the present disclosure. Accordingly, aspects of the carrier aggregation and unlicensed spectrum operation which are not described in detail herein may be implemented in accordance with known techniques.

Modes of operation for the wireless telecommunications network 400 represented in FIG. 4 in accordance with certain embodiments of the disclosure will now be described. The general scenario for these embodiments is assumed to be one in which a carrier aggregation capable terminal device is operating in an LTE-A cell as normal, and the base station determines that it should configure the LTE-U capable terminal device with an additional aggregated carrier using LTE-U resources. Thus the LTE-A carrier provides a Pcell for the terminal device and the LTE-U resources provide one or more Scell(s) for the terminal device. It will be appreciated the LTE-A resources may also be used to provide component carriers associated with one or more further Scells(s) in accordance with conventional carrier aggregation techniques. For the examples described with reference to FIG. 4, the LTE-A transmissions in the licensed frequency band and the LTE-U transmissions in the unlicensed frequency band, and thus the Pcell and Scell(s), are both made from the same base station 404, but this may not be the case in other example embodiments. The LTE-U carrier could in general be utilised with a TDD (time division duplex) or FDD (frequency division duplex) frame structure. However, a consequence of some aspects of existing regulatory restrictions on unlicensed spectrum usage in some regions means that TDD or downlink-only FDD operation may, at least currently, be more likely. Within the present disclosure, PCells and Scells will sometimes be referred to as primary component carriers and secondary component carriers, respectively.

Figure 5:
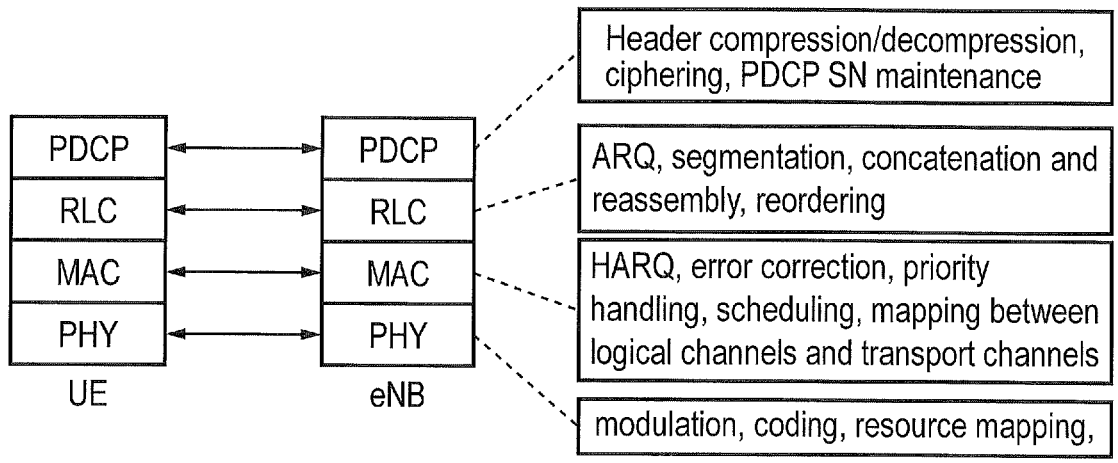
FIG. 5 schematically represents an example of part of protocol stacks for a mobile terminal and base station.

FIG. 5 is an illustration of part of protocol stacks for a mobile terminal and base station, which is shared between the user and control plane. While the PHY (physical) layer is for the modulation, coding, resource mapping, amongst other things, the MAC (Media Access Control) layer deals with HARQ, error correction, priority handling, scheduling, mapping between logical channels and transport channels, amongst other things. As previously mentioned, HARQ data indicates whether or not previously transmitted data has been successfully received by the other party. HARQ is used in both uplink and downlink although the HARQ process may vary slightly depending on whether the data acknowledged was uplink or downlink data. When data is received at a receiver (e.g. a UE or a base station), the MAC layer will use a CRC (Cyclic Redundancy Check) to confirm whether the data has been received correctly. Essentially, the CRC checks for data integrity of the data block that it receives as an input. The result of the CRC checker can be used by the HARQ function for reporting errors in transmissions, wherein the HARQ module will report positive acknowledgements ("ACK" messages) and negative acknowledgements ("NACK" messages). In some examples, if a corrupted data block has been identified by a CRC checker and reported by the HARQ function with a NACK message, when the data block is transmitted again by the transmitter (e.g. following a NACK report) and received by the receiver again, the receiver can use both the original and the retransmitted data blocks to try to decode the information, which is sometimes referred to as "soft combining". In this case, the bits previously received corresponding to the corrupted data block are not discarded but are stored instead and they can then be combined with the retransmitted signal. Whether soft combining is used or not, if a data block has been reliably decoded, it can then be passed on to other elements for forwarding to higher layers. On the other hand, if it has not been decoded, the receiver will respond with a NACK message so that the transmitter can transmit this message again. The transmitter can then re-transmit the incorrectly received message to the receiver. With a view to providing a fast and low latency feedback, the HARQ feedback (ACK or NACK) message is sent as a single bit, i.e. 0 or 1, wherein the timing of the bit indicates which transmission attempt it relates to. As a result, the HARQ feedback does not require great resources and is sent very quickly with a view to providing simple fast and low delay ACK/NACK information to the transmitter. As mentioned above, while this can provide fast and low delay feedback, by transmitting the feedback on one bit only, the transmission of the feedback can be more prone to transmission errors, i.e. the reliability of the feedback can be lower.

Once a transmission has been received correctly at the receiver, the corresponding data will be processed at the above layer, i.e. at the RLC (Radio Link Control) layer. The RLC layer is responsible for, amongst other things, segmentation, concatenation and reassembly, reordering and ARQ. ARQ (Automatic Repeat Query or Automatic Repeat reQuest) is the acknowledgement mechanism for the RLC layer which is provided in addition to the HARQ mechanism at the MAC layer. The ARQ mechanism in RLC provides a more reliable feedback mechanism based on asynchronous status reports with explicit sequence numbers that are protected by a cyclic redundancy check (CRC) such that the receiver can detect errors in the report. Such an acknowledgment mechanism uses more resources hence the RLC is feedback is sent infrequently, in particular compared to HARQ feedback. As a result, the ARQ mechanism is expected to have more delay between the transmission and corresponding report compared to the HARQ mechanism, however it is expected also to achieve a higher reliability. Overall, the combination of ARQ and HARQ is expected to provide a good trade-off between high data throughput, low feedback overhead, delay and reliability. Even though a terminal or base station will send HARQ feedback at the MAC layer and ARQ feedback at the RLC layer, the two mechanisms are generally operating independently and ARQ retransmissions will be carried out based on ARQ feedback while the MAC layer will not be aware of whether the RLC data it has been given to transmit is a first transmission or a re-transmission.

Conventionally, scheduling strategies in the base station are vendor or implementation specific and do not form part of the standard specifications while some scheduling strategies or procedures in the terminal are defined in some of the standard specifications. Whether at the base station, terminal or any other node transmitting radio signals, most scheduling strategies are based on information such as (a) channel conditions, (b) buffer status and priorities of the different data flows and (c) interference in neighbouring cells. As previously discussed, the use of unlicensed carriers introduces additional challenges for the scheduling procedure, in particular at the base station, due to the unpredictable nature of interference and to the lack of control over or communication with the source of the interference. Aspects of the impact of the use of unlicensed spectrum on the radio access network have been considered in R2-150188 [7] which resulted in an agreement on (1) in view of the additional complexity, Downlink HARQ processes should not be moved to another carrier and using for example RLC retransmissions is considered simpler from an implementation perspective and (2) for the downlink, any scheduling and radio bearer selection is decided solely by the base station and is thus not being discussed. In other words, at this stage the main body considering this question recommends not to make any changes and to rely on existing procedures.

However, when feedback is reported in a mobile system which uses one or more unlicensed bands, the interference in the unlicensed spectrum can affect the transmission of data (and the reporting of successful and unsuccessful transmissions) in a manner that is less predictable and less controllable compared with a conventional mobile network operating on a licensed spectrum. In particular, due to the lack of control over the unlicensed band, conventional methods to oversee the acknowledgement and/or reduce interference may not be as appropriate or as efficient when used in an unlicensed spectrum. This in turn can cause a decrease in the reliability of the HARQ procedures and hence trigger more frequent retransmissions at the higher RLC layer. In addition, the HARQ errors on an unlicensed (e.g. LTE-LAA) component carrier can be correlated: if an error occurs due to interference on a constituent unlicensed carrier, that interference is more likely to persist from subframe to subframe. As a result, the reliability of HARQ on a particular component carrier could potentially be severely impacted even when other component carriers remain reliable. While one unlicensed component carrier is experiencing interference persisting from subframe to subframe, another unlicensed component carrier may not be experiencing this interference; additionally since the primary carrier can operate on licensed spectrum whose interference can be controlled by the scheduler, persisting interference on the primary component carrier can be reduced. While relying on an RLC re-transmission may ultimately result in a successful transmission, if the carrier is experiencing interference for a relatively long period of time rather than for short bursts of time, such a procedure is likely to be inefficient and thus unsatisfactory.

Figure 6:
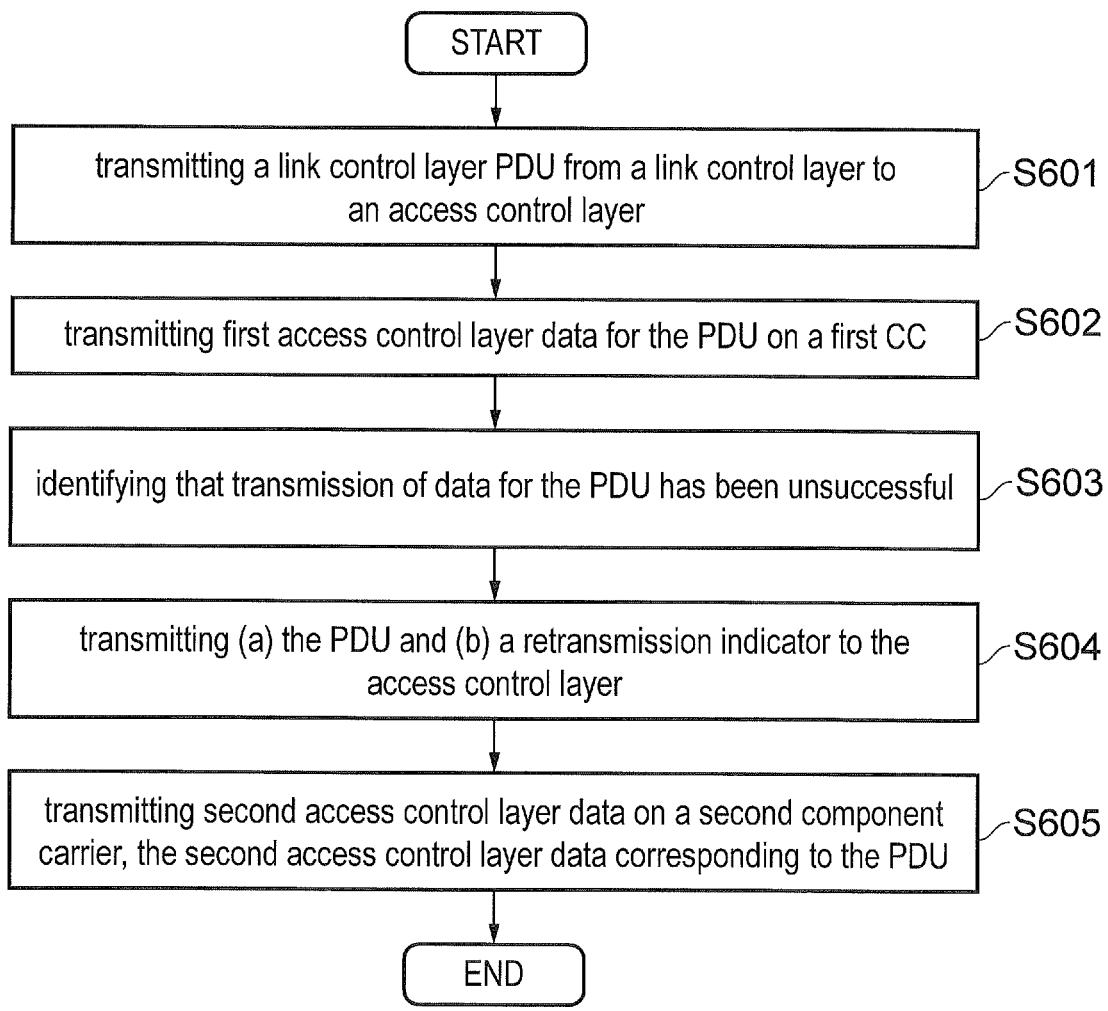
FIG. 6 illustrates an example method of communicating data in a wireless telecommunications system.

FIG. 6 shows an example method of communicating data in a wireless telecommunications system and in particular of retransmitting data over a component carrier "CC" different from a CC previously used for transmitting data. The method relates in particular to transmitting a link control layer Packet Data Unit "PDU" to a destination, via a lower access control layer. At step S601, a link control layer PDU is transmitted from a link control layer to an access control layer, for example from a link control layer module to an access control layer module. An example link control layer is the RLC layer in the LTE specifications; an example access control layer is the MAC layer in the LTE specifications. Then, at step S602, first access control layer data is transmitted for the PDU on a first CC. If the first data is successfully transmitted, conventional mobile network procedures can then be carried out. On the other hand, the method can move to step S603 where it is identified that transmission of data for the PDU has been unsuccessful. This can be identified based on for example a notification from the access control layer that attempts to transmit the first data have failed at least N times, with N≥1, or based on an expiry of a timer before a positive acknowledgement for the PDU is received (for example from the link control layer of the destination or of another party) or any other suitable condition or set of conditions. Once it has been identified that the PDU has not been transmitted successfully, the method moves to step S604 where (a) the PDU and (b) a retransmission indicator are transmitted to the access control layer, for example to an access control layer module. As will be understood from the present disclosure, in other examples no retransmission indicator is sent along with the PDU and the link layer layer sends the PDU for retransmission and can for example send instructions to use a specific carrier or type of carrier or not to use the first CC (see below). Returning to the example of FIG. 6, as a result, the access control layer is then aware that the PDU is not a first transmission but is a re-transmission. The method then moves on to step S605 where, upon receipt of the PDU and retransmission indicator, second access control layer data corresponding to the PDU is transmitted on a second component carrier, the second component carrier being different from the first component carrier. As a result, the access control layer can change the CC on which data relating to a PDU is transmitted if the PDU is a retransmission at the link control layer. For example, if the transmission failure has been identified by N NACK messages being received for the first data, at the access control layer, this could be an indication that the first CC is suffering from a poor quality link and it can thus be decided that it is more suitable to send the re-transmission data on a different CC.

Conventionally, the access layer is fully (or nearly fully) "control layer"-agnostic and is unaware of whether the PDU it is transmitting is a first transmission or a re-transmission. As a result, the access layer deals with a PDU received from the link control layer regardless of whether the PDU is a transmission or retransmission and the access layer only deals with retransmissions to the extent that they are access layer retransmissions. It is noteworthy that, in an LTE-A environment, it could be more likely for an interference caused by signals from a different technology to last for a longer period than in a controlled licensed mobile environment such that it may be appropriate to change component carrier for retransmission messages at the control layer level. Also, in view of this or of any other suitable reason, it may be considered appropriate, if the first CC was in an unlicensed spectrum, to use as the second CC a CC in a licensed spectrum. For example, the second CC may be a carrier used for providing additional capacity in a carrier aggregation system such as a SCell in a licensed band or may be a primary carrier (PCell) which is generally provided in the licensed spectrum.

In one example, if transmissions at the access control layer have been unsuccessful and the PDU is re-transmitted along with a retransmission indicator, the access control layer can be configured to automatically transmit access control data for (re)transmitting the PDU on the CC for the PCell so as to reduce the likelihood of experiencing successive transmission failures for the PDU.

In the interest of conciseness, the "link control" layer is sometimes herein referred to as "Radio Link Control" or "RLC" layer and, likewise, the "access control" is sometimes referred to as "Media Access Control" or "MAC" layer. However, the present disclosure is not limited to MAC and RLC and, whenever a MAC or RLC example is mentioned, the teachings and discussions provided in respect of such an example apply equally to any other access control or link control layer, respectively. It will nonetheless be recognised that the present disclosure is applicable to specific RLC and MAC protocols and procedures, for example as defined or used by the 3GPP or by any other standardisation body or manufacturer, even if not limited to them.

The teachings of the present disclosure may be implemented in a variety of manners and possible example implementations are described below. Each of the examples below discusses one aspect of possible implementations wherein these aspects may be combined as appropriate. In other words, any suitable combination of the features discussed below is expressly considered under the present disclosure.

Uplink PDU

Figure 7:
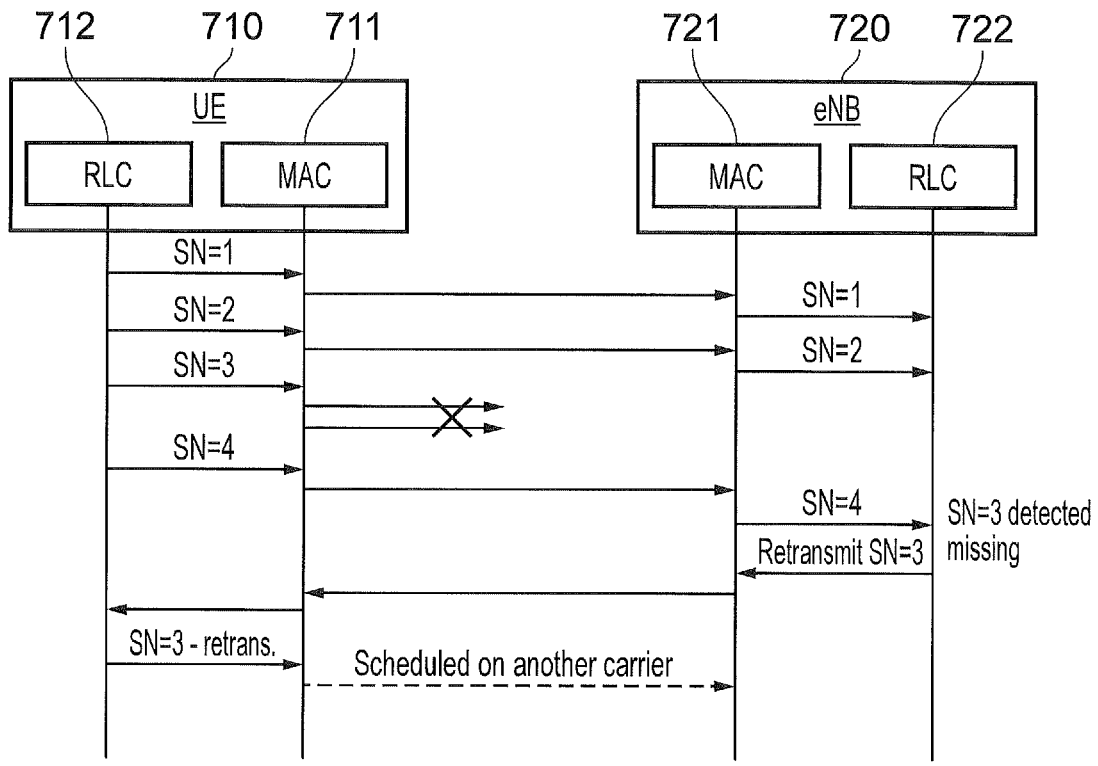
FIG. 7 provides a schematic diagram illustrating an example communication between a terminal and a base station.

The teachings of the present disclosure apply to an RLC PDU to be sent on the uplink. For example, it can be used for PDUs from the path from a terminal to a base station, such as from a terminal or relay node to a relay node or base station. In the interest of conciseness, the example of a terminal-base station link will be discussed however the teachings apply equally to any other type of uplink. FIG. 7 provides a schematic diagram illustrating an example communication between a terminal 710 and a base station 720. Each of the terminal 710 and base station 720 implements MAC and RLC procedures via MAC modules 711 and 721, respectively, and RLC modules 712 and 722, respectively. In accordance with conventional communication techniques, the RLC module 712 and MAC module 711 of terminal 710 communicate with the corresponding modules of the base station, i.e. RLC module 722 and MAC module 721 using lower layers. FIG. 7 illustrates an example where the RLC module 712 wishes to send four PDUs to the base station 720, i.e. to the RLC module 722 of the base station. To do so, the RLC module 712 communicates each PDU to the MAC module 711 for transmission. In this example the PDU are numbered with a Sequence Number "SN", from 1 to 4. In this example, while the transmission of the PDUs with SN=1 and SN=2 is successful, the transmission of the PDU for SN=3 fails. In this example figure, two attempts to transmit corresponding MAC data to the MAC module 721 have been attempted and have failed, but the skilled person will recognised that more or fewer attempts could have been carried out. The terminal 710 is unaware of the transmission failure and continues transmitting the PDUs to the base station. When the base station, in particular the RLC module 722 receives the PDU SN=4, it detects that PDUs SN=1, SN=2 and SN=4 have been received and thus that PDU SN=3 is missing. The detection of the missing PDU may be done at the receiver simply by detecting a missing PDU in the sequence, or alternatively for example by detecting that a PDU reordering timer has expired before all of the PDUs required to form an entire SDU have been successfully received, or alternatively the transmitter may include a poll (in the $4^{th}$ PDU in this example) to the receiver to request a status report—the status report will contain acknowledgements for PDU SNs 1, 2, 4 and a negative acknowledgement for PDU SN 3. The RLC module 722 can then request a retransmission of PDU SN=3 from the terminal 710, more specifically from the RLC module 712. Once the RLC module 712 receives the retransmission request it can send PDU SN=3 to the MAC module 711 again, for retransmission, and can also transmit a retransmission indicator to the MAC module 711 so that the MAC module can be made aware that the PDU relates to a retransmission, i.e. to a PDU for which transmission has previously been attempted.

Once the MAC module 711 is aware that the PDU is a re-transmission, it can select a carrier which can reduce or minimise the risk of further transmission failure. For example, the MAC module 711 may automatically select the PCell for transmitting PDU SN=3 again. The PDU SN=3 can then be transmitted again, but on a different carrier compared with the previous transmission, thereby increasing the likelihood of achieving a successful transmission of the PDU.

In mobile networks, uplink resources are generally allocated by network elements, and often by the base station. As a result, the terminal 710 may in some cases have to request additional resources for the retransmission, if for example it does not already have resources available in the carrier it intends using for the retransmission. This can be carried out in the usual manner or in any other suitable manner.

In some cases, the terminal 710 may request resources on a selected carrier (e.g. on the PCell) but in other cases it may not be able to indicate which resources to use and may instead be expected to use resources selected by the base station. In the latter case, the MAC module 711 may request resources to the base station 720 so as to be allocated resources on a different carrier. This can be achieved using several different ways. For example, the MAC module 711 may include in a Scheduling Request (SR) and/or Buffer Status Report (BSR) an indication that the resources required are for retransmission and, optionally, an indication of resources (e.g. frequency resources) used for the previous transmission. The information provided in the resources request may be based, or in some cases identical, to the information in the retransmission indicator received from the RLC module of the terminal.

The base station can then allocate resources accordingly. For example, if the base station receives a request for resources for a retransmission of a PDU previously transmitted on an unlicensed-spectrum SCell, the base station may try to allocate resources on a licensed-spectrum SCell or PCell. Accordingly, the MAC module 711 can then transmit MAC data for the re-transmitted RLC PDU using resources in a different frequency spectrum with a view to reducing the chances of experiencing poor link quality and/or interference again. Generally, when a re-transmission relates to a transmission previously attempted on an unlicensed component carrier, the second component carrier for transmitting the re-transmission data may in contrast be selected as a licensed component carrier. This may reduce the level of uncontrollable interference the re-transmission signals are likely to experience. Whenever an unlicensed spectrum or component carrier, this can be also applicable to any spectrum or component carrier, respectively, which uses frequency resources which can be shared by the wireless telecommunications system and by other wireless communications systems.

Downlink PDU

Likewise, the teachings of the present disclosure may be applied to the transmission of PDU on the downlink. For example, it can be used for PDUs from the path from a base station to a terminal, such as from a base station or relay node to a relay node or terminal. In the interest of conciseness, the example of a base station-terminal link will be discussed below however the teachings apply equally to any other type of downlink.

In this case, the principles discussed in respect of the uplink apply equally to the downlink. In particular, the RLC module of the base station may attempt to send one or more PDUs to the RLC module of the terminal and, if a PDU has to be retransmitted, the PDU module of the base station can send a retransmission indicator to the MAC module of the base station or the MAC module can indicate the resources available to the RLC per carrier. One of the main differences between the uplink and downlink examples is the allocation of resources for the retransmission. As the base station is generally responsible for the allocation of resources, in the downlink it could then simply select different resources and, in this case, it does not have to request resources to a third party like the terminal may have to do in the uplink.

Sidelink PDU

Likewise, the teachings of the present disclosure may be applied to the transmission of PDU on the sidelink. For example, it can be used for PDUs sent between relay nodes and/or devices such as in a relay or device-to-device (D2D) arrangement. The term sidelink generally refers to transmissions which are between two radio devices wherein the radio devices are not base station. It includes for example D2D communication between terminals and/or relay nodes.

Again, one of the main differences with the uplink or downlink examples above would be in respect of the allocation of resources. In the absence of a base station allocating resources in the uplink and in the downlink, different techniques may be used for resource allocation and the present teachings may be applied accordingly. In an example where the node which retransmits the PDU is responsible for its own resources allocation (e.g. in an opportunistic approach), it can act autonomously when trying to obtain resources in a different frequency range, for example as the base station does in the downlink example above. In an example where the node relies on further node(s) for resources allocation, it can then try to request resources in a different frequency range from the further node, for example as the terminal does in the uplink example above. If any other resources allocation technique is used, the present disclosure can be adapted accordingly wherein the node can request resources in a different frequency band and/or indicate that the resources are for a retransmission (with an optional indication of the previous carrier or frequency band used) with a view to communicating the retransmission data using different frequencies.

Selection of Carrier

The new carrier selection can be decided at the MAC layer of the transmitter or of any other suitable element. For example, when the RLC layer triggers a selection of a different carrier (or increases the likelihood of the use of a different carrier) using a retransmission indicator, the relevant MAC layer may then select a different carrier which may involve maintaining a log or record of a carrier used for transmitting data relating to a PDU or may involve a scheduling strategy which prioritises or mandates scheduling of retransmissions on one of the carriers, for example the primary component carrier. For example, the element responsible for resource allocation may maintain a log of which carrier or carriers were used for transmitting data for a specific PDU. As a result, if this element is later requested to allocate resources for a retransmission, it can refer to this log or record and select different a frequency range, if appropriate or possible, compared with the frequency range used for the previous transmission of the PDU.

Figure 8:
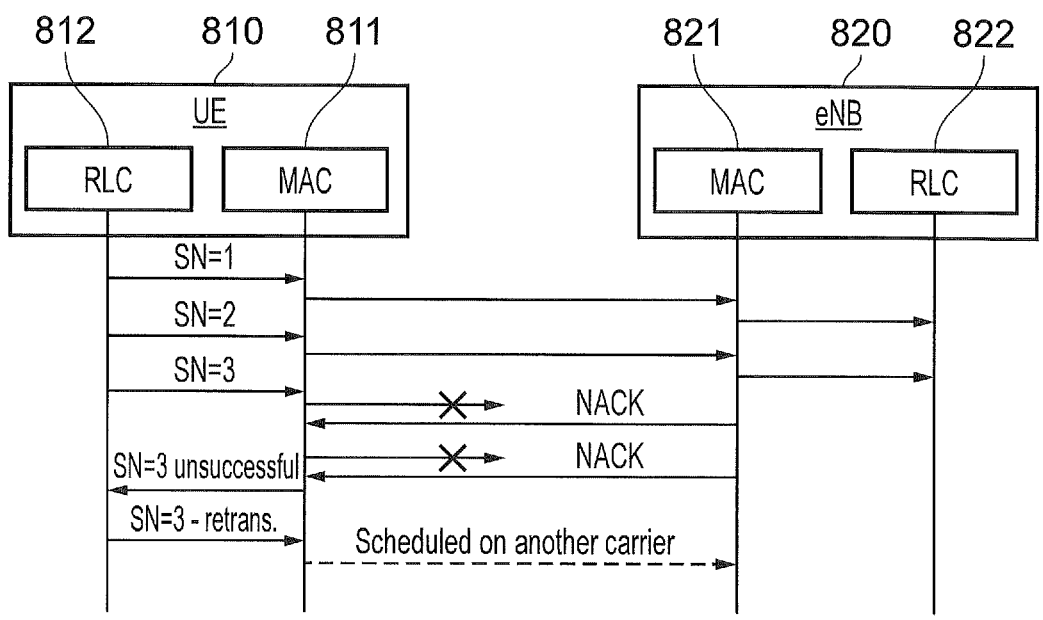
FIG. 8 provides a schematic diagram illustrating another example communication between a terminal and a base station.

The element allocating resources may be the same as or different from the element requesting the resources such that the record may be maintained in the transmitter (e.g. the terminal in FIG. 7 or 8) and/or in another element (e.g. the base station in FIG. 7 or 8 is it allocates uplink resources), if appropriate.

In other cases the transmitter may maintain a log or record and may decide that using the PCell or a specific SCell would be appropriate for a retransmission of data previously sent on an SCell with poor link quality and may indicate to the resource allocating element that it wishes to use this PCell or SCell for retransmission.

The record may for example be a rolling log which includes entries limited in number and/or in time (e.g. for a rolling period of a pre-determined duration).

The RLC layer may select the carrier to send a transmission or retransmission of a PDU, based on separate indications from the MAC layer per component carrier, or separate indications per licensed and unlicensed carriers. The RLC layer would need to perform RLC segmentation per carrier, and prioritise PDU retransmissions on PCell or licensed carriers.

An alternative approach to the MAC layer being solely in charge of the carrier selection would be the RLC layer being at least in part, or fully, responsible for the carrier selection. For example, rather than the MAC layer indicating to the RLC layer the total available transport block size (amount of available resources that can be used to send data) that can be used for transmission of RLC PDUs (for example as per the current LTE system), the MAC layer can indicate available resources per carrier and/or separately for PCell and SCell and/or separately for licensed and unlicensed carriers. The RLC layer can be then responsible for forming PDUs accordingly, and prioritising PDU retransmissions on the PCell or licensed carriers. While the RLC layer was previously unaware of the type of carrier used for transmission but only aware of the resources available for transmission, in this case the carrier selection may no longer be invisible or transparent to the RLC layer. For example, rather than having the MAC layer prioritising the RLC transmissions onto a specific carrier (e.g. following previous failure to transmit on another carrier), the RLC layer may be involved in the selection of the carrier.

For example, the RLC layer may indicate to the MAC layer, for some of or all of the RLC PDUs, specifically which carrier to use for transmitting a PDU. In one example, the RLC layer may always include the carrier if the PDU is for a retransmission and may or may not indicate the carrier for PDU that are not being retransmitted. Also, in any of the cases where the RLC layer participates in the carrier selection, the RLC layer may indicate the specific carrier and/or the type of carrier. For example, it may indicate that the PDU is to be sent on any carrier, on the PCell, on any SCell, on a specific SCell, on a licensed carrier, on an unlicensed carrier.

Accordingly, upon identification that transmission of data for a PDU has been unsuccessful, the RLC module may re-transmit the PDU and cause the re-transmitted PDU to be transmitted via MAC data using resources allocated within a different component carrier wherein the selection of the second carrier is based on an indication of resources available per carrier. For example, the RLC layer may select the different/second carrier based on the indication of resources available per carrier and may transmit, to the MAC layer, an indication of the selected carrier. Generally, the causing of the PDU retransmission on another carrier is at least partly based on one or more available resources indications, separately per component carrier. The scheduling of retransmissions may then be prioritised on one of the carriers in view of the transmission being a retransmission. From one perspective, this can be viewed as the link control layer prioritising sending re-transmitted PDUs on the further (second) component carrier based on indications from the access control layer of available resources on each of the available component carriers.

Number of MAC-NACKs

When identifying that a PDU transmission has been unsuccessful, different techniques can be used, alone or in combination. One of these techniques involves relying on a number of errors for the MAC transmissions of the data corresponding to the PDU.

FIG. 8 provides a schematic diagram illustrating another example communication between a terminal 810 having a MAC module 811 and an RLC module 812 and a base station 820 having a MAC module 821 and an RLC module 822. This example is similar to that of FIG. 7 such that, in the interest of brevity, the description of the common elements will not be repeated herein. One difference with the example of FIG. 7 is in how the error in the transmission of the PDU SN=3 is identified. While FIG. 7 illustrates an example of error detection at the receiver side (detecting that PDU SN=3 has not been received), the error can also be detected at the transmitter side, as illustrated in FIG. 8. In this example the MAC module 811 received NACK responses to its transmission of MAC data relating to the PDU SN=3 and thus identifies that the MAC data for PDU SN=3 has not been successful. In another example, it could also involve the MAC module 811 detecting at least one of a NACK response and a lack of an ACK or NACK response for identifying an unsuccessful MAC transmission. Once N transmissions have been unsuccessfully attempted (with N≥1), the MAC module 811 may then inform the RLC module that the transmission of the PDU SN=3 has been unsuccessful and the RLC module 812 can then attempt a retransmission as discussed previously, by sending the PDU again along with a retransmission indicator.

Number of RLC errors

Likewise, identifying an error in the PDU transmission can be carried out (alternatively or additionally) at the RLC layer once N (with N≥1) RLC transmission errors have been detected. An RLC transmission error can be detected in any appropriate manner, including in some example: receiving an RLC-NACK from the destination RLC module, not receiving any (RLC-)ACK for the previous transmission (for example before the expiry of a timer or of a time window for receiving a positive acknowledgment), receiving an incorrect acknowledgement response to a previous transmission, or any other error detection technique.

Once a maximum or threshold number of RLC errors has been reached, the RLC module can start the re-transmission process and re-send the PDU along with an indication that the PDU is a re-transmission. According to this technique of monitoring RLC errors, the MAC module may not have to monitor successful or unsuccessful transmission of RLC PDUs which may therefore facilitate the conventional separation between the various layers and thus simplifies implementations. In some examples, the maximum can be set to one with a view to having all PDU retransmissions sent via a different carrier compared with the carrier used for the first transmission.

Listen-Before-Talk

In another example, the error detection can follow a Listen-Before-Talk "LBT" procedure which may be carried out before transmitting radio data. For example, before transmission of data on an unlicensed spectrum, the transmitter may monitor the link in an attempt to detect its quality and likely interference level. In an event that the LBT procedure identifies that the link quality on a carrier is poor, the MAC layer may decide to stop transmitting on this carrier. This may cause the transmitter to cancel planned transmissions for this carrier. If for example the MAC module of the transmitter was expected to send MAC data for a PDU and decides to cancel this transmission as a result of the LBT procedure, it can inform the RLC module that the transmission has been cancelled so as to trigger an RLC re-transmission which can then be re-directed to a different carrier.

In an alternative example if the LBT procedure identified that the link quality on a carrier is poor (e.g. below a threshold), then this could be considered as a HARQ NACK (unsuccessful transmission) with a view to avoiding causing a delay to the retransmission (e.g. if waiting for the LBT procedure to give a positive feedback) or causing the cancellation of transmission. This allows other HARQ error conditions such as exceeding maximum retransmission threshold to be met in similar timescales as regular LTE on the licensed carrier, and allows the opportunity for HARQ retransmissions in case of only temporary interference detected by the LBT procedure.

Retransmission Indicator

The retransmission indicator transmitted from the RLC module to the MAC module, if used, when retransmitting a PDU may include any suitable information for a retransmission in accordance with the present disclosure. It will include at least an indicator that the PDU is a retransmission. This may be provided in the form of a bit (0 or 1) transmitted with the PDU to the MAC layer. In another example, the RLC layer may transmit a message that identifies the PDU (for example with a SN) and a retransmission. In another example, the retransmission may indicate how many times this PDU has been or is being retransmitted. For example, the element allocating resources may take this into account when determining whether to move the transmission to a different carrier. If for example retransmissions are automatically moved to the PCell after a certain number of errors, the number of error can be adjusted depending on how much free capacity is or expected to be available on the PCell. If for example the PCell has a large amount of unused resources, the retransmissions can be moved after one error only such that the first retransmission would automatically be moved to the PCell. On the other hand, if the PCell is closer to its full capacity, the number may be set to a larger number, for example 3, 4, 5 or 10 such that only transmissions which have failed several times and are probably experiencing longer lasting interference will be moved to the PCell.

The indicator may also in some cases include at least one of: information identifying the cause for the failure, the method for identifying the transmission failure, the carrier or frequency range previously used, a priority level, and any other suitable information.

Therefore, in accordance with the present disclosure there is provided methods and apparatuses for communicating data in a mobile network system wherein an access control layer can identify which of the data it is transmitting relates to a retransmission at a higher layer with a view to sending some retransmission data using a frequency range which differs from that of the previous transmission or transmissions which have failed.

In accordance with one aspect, there is provided a method of communicating data in a wireless telecommunications system, the system comprising a base station and one or more terminals operable to communicate via a wireless interface and in accordance with a mobile communication protocol, the wireless interface being provided by at least a first component carrier within a first frequency band and a second component carrier within a second frequency band. The mobile communication protocol comprises: access control layer procedures for outputting data for use by physical layer procedures for transmission via the wireless interface, wherein the access control layer procedures comprise selecting frequency resources for transmitting the data via the wireless interface; and link control procedures for generating packet data units "PDUs" for use by the access control layer procedures for transmission to a destination. The method comprises: the link control procedures generating a PDU for transmission to a destination using the access control layer procedures; the access control procedures using frequency resources in the first frequency band for transmitting data for the PDU via the wireless interface; upon receipt of a feedback message that an attempt to transmit the PDU to the destination has been unsuccessful (for example at least N times, with N≥1), retransmitting the PDU to the access control layer procedures with an indication that the PDU relates to a re-transmission; and upon receipt of the indication that the PDU relates to a re-transmission, the access link control procedures requesting frequency resources outside of the first frequency band for transmitting the data for the PDU via the wireless interface.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

As used herein, transmitting information or a message to an element may involve sending one or more messages to the element and may involve sending part of the information separately from the rest of the information. For example, a PDU from the RLC layer may be sent as a single message at the MAC layer while in other implementation it may be sent in two or more MAC messages, possibly with data from a different PDU.

The present disclosure, although discussed in respect of (and particularly suitable to) a 3GPP- and optionally LTE-mobile system, is not limited to these examples. Likewise, although the description uses terms which can sometimes be based on current names or features of the 3GPP or other standards, the teachings of the present disclosure are not limited to this existing procedures or standards and are intended to apply to any suitable arrangement.

The following clauses define further example aspects and features of the present technique:

Clause 1. A method of communicating data in a wireless telecommunications system, the system comprising a base station and one or more terminals operable to communicate via a wireless interface and in accordance with a mobile communication protocol, the wireless interface being provided by at least a first component carrier within a first frequency band and a second component carrier within a second frequency band, wherein the method comprises:
  transmitting a link control layer Packet Data Unit "PDU" from a link control module to an access control layer module for transmission, the link control layer being at a higher layer than the access control layer;
  transmitting first access control layer data using resources allocated within the first component carrier, wherein the first access control layer data corresponds to the PDU;
  identifying that transmission of data for the PDU has been unsuccessful; and
  upon identification that transmission of data for the PDU has been unsuccessful, the link control module re-transmitting the PDU and causing the re-transmitted PDU to be transmitted via second access control layer data using resources allocated within the second component carrier.

Clause 2. A method according to clause 1 wherein,
the link control module re-transmitting the PDU comprises the link control module transmitting to the access control layer module (a) the PDU and (b) a retransmission indicator indicating that the PDU relates to a re-transmission; and
  upon receipt of the PDU and of the retransmission indicator at the access control layer module, transmitting the second access control layer data using the resources allocated within the second component carrier.

Clause 3. A method according to clause 2, wherein the retransmission indicator includes at least one of: a retransmission flag, a number of unsuccessful attempts for transmitting the PDU, a carrier or type of carrier used for previously attempting to transmit the PDU and a carrier or type of carrier for re-transmitting the PDU.

Clause 4. A method according to any preceding clause wherein transmitting second access control layer data comprises requesting allocation of resources, wherein the resources allocation request comprises at least one of: an identification for the PDU, an retransmission indication, an indication of the first component carrier as the component carrier for the previous transmission of the PDU and a request for resources on the second component carrier.

Clause 5. A method according to any preceding clause, upon receipt of a feedback message that at least one attempt to transmit data for the PDU has been unsuccessful, identifying that transmission of the data for the PDU has been unsuccessful.

Clause 6. A method according to clause 5 wherein the feedback message indicates that an attempt to transmit the first access control layer data for the PDU has been unsuccessful at least N times, with N≥1.

Clause 7. A method according to clause 6 wherein an attempt to transmit the first access control layer data for the PDU is considered as unsuccessful when a negative acknowledgement message is returned in response to the attempted transmission.

Clause 8. A method according to any of clauses 5 to 7, wherein the feedback message indicates that, following a listen-before-talk procedure, a retransmission of the first access control layer data for the PDU cannot be carried out.

Clause 9. A method according to any preceding clause wherein, upon expiry of a timer before a positive acknowledgement message is received, the link control module identifies that the transmission of data for the PDU has been unsuccessful.

Clause 10. A method according to any preceding clause wherein the access control layer is a Media Access Control "MAC" layer.

Clause 11. A method according to any preceding clause, wherein the link control layer is a Radio Link Control "RLC" layer.

Clause 12. A method according to any preceding clause, wherein the first access control layer data is identical to the second access control layer data.

Clause 13. A method according to any preceding clause, wherein transmitting the first access control layer data comprises maintaining at the access control module information indicating transmission of the first access control layer data on the first component carrier.

Clause 14. A method according to any preceding clause, wherein the wireless telecommunications system implements a carrier aggregation scheme wherein data can be transmitted simultaneously over two or more component carriers, one of the two or more component carriers being a primary component carrier and each of the other two or more component carriers being a secondary component carrier;
  the first component carrier is a secondary component carrier; and
  the second component carrier is the primary component carrier.

Clause 15. A method according to any preceding clause, wherein the PDU is for downlink transmission.

Clause 16. A method according to any of clauses 1 to 14, wherein the PDU is for uplink transmission.

Clause 17. A method according to any preceding clause, wherein the wireless telecommunications system is a 3GPP telecommunication system.

Clause 18. A telecommunication device for communicating data in a wireless telecommunications system, the system comprising a base station and one or more terminals operable to communicate via a wireless interface and in accordance with a mobile communication protocol, the wireless interface being provided by at least a first component carrier within a first frequency band and a second component carrier within a second frequency band, wherein the telecommunication device comprises:
  a link control module at a link control layer and
  an access control layer module at an access control layer, the link control layer being at a higher layer than the access control layer;
wherein the telecommunication device is configured to:
  transmit, from the link control module to the access control layer module, a link control layer Packet Data Unit "PDU" for transmission;
  transmit first access control layer data using resources allocated within the first component carrier, wherein the first access control layer data corresponds to the PDU;
  identify that transmission of data for the PDU has been unsuccessful; and
  upon identification that transmission of data for the PDU has been unsuccessful, re-transmit, from the link control module, the PDU and cause the re-transmitted PDU to be transmitted via second access control layer data using resources allocated within the second component carrier.

Clause 19. A telecommunication device of clause 18, wherein the telecommunication device is one of a terminal, a base station and a relay node.

Clause 20. A telecommunication device of any of clauses 18 to 19 wherein:
the telecommunication device being configured to re-transmit the PDU comprises the telecommunication device being configured to transmit from the link control module to the access control layer module (a) the PDU and (b) a retransmission indicator indicating that the PDU relates to a re-transmission; and
the telecommunication device is configured to, upon receipt of the PDU and of the retransmission indicator at the access control layer module, transmit the second access control layer data using the resources allocated within the second component carrier.

Clause 21. A telecommunication device of clause 20, wherein the retransmission indicator includes at least one of: a retransmission flag, a number if unsuccessful attempts for transmitting the PDU, a carrier or type of carrier used for previously attempting to transmit the PDU and a carrier or type of carrier for re-transmitting the PDU.

Clause 22. A telecommunication device of any of clauses 18 to 21 wherein the telecommunication device being configured to transmit the second access control layer data comprises the telecommunication device being configured to request allocation of resources, wherein the resources allocation request comprises at least one of: an identification for the PDU, an retransmission indication, an indication of the first component carrier as the component carrier for the previous transmission of the PDU and a request for resources on the second component carrier.

Clause 23. A telecommunication device of any of clauses 18 to 22, the telecommunication device is configured to, upon receipt of a feedback message that at least one attempt to transmit data for the PDU has been unsuccessful, identify that transmission of the data for the PDU has been unsuccessful.

Clause 24. A telecommunication device of clause 23 wherein the feedback message indicates that an attempt to transmit the first access control layer data for the PDU has been unsuccessful at least N times, with N≥1.

Clause 25. A telecommunication device of clause 24 wherein an attempt to transmit the first access control layer data for the PDU is considered as unsuccessful when a negative acknowledgement message is returned in response to the attempted transmission.

Clause 26. A telecommunication device of any of clauses 23 to 25, wherein the feedback message indicates that, following a listen-before-talk procedure, a retransmission of the first access control layer data for the PDU cannot be carried out.

Clause 27. A telecommunication device of any of clauses 18 to 26 wherein the link control module is configured to, upon expiry of a timer before a positive acknowledgement message is received, identify that the transmission of data for the PDU has been unsuccessful.

Clause 28. A telecommunication device of any of clauses 18 to 27 wherein the access control layer is a Media Access Control "MAC" layer.

Clause 29. A telecommunication device of any of clauses 18 to 28, wherein the link control layer is a Radio Link Control "RLC" layer.

Clause 30. A telecommunication device of any of clauses 18 to 29, wherein the first access control layer data is identical to the second access control layer data.

Clause 31. A telecommunication device of any of clauses 18 to 30, wherein telecommunication device being configured to transmit the first access control layer data comprises the telecommunication device being configured to maintain at the access control module information indicating transmission of the first access control layer data on the first component carrier.

Clause 32. A telecommunication device of any of clauses 18 to 31, wherein
the wireless telecommunications system implements a carrier aggregation scheme wherein data can be transmitted simultaneously over two or more component carriers, one of the two or more component carriers being a primary component carrier and each of the other two or more component carriers being a secondary component carrier;
the first component carrier is a secondary component carrier; and
the second component carrier is the primary component carrier.

Clause 33. A telecommunication device of any of clauses 18 to 32, wherein the PDU is for downlink transmission.

Clause 34. A telecommunication device of any of clauses 18 to 32, wherein the PDU is for uplink transmission.

Clause 35. A telecommunication device of any of clauses 18 to 34, wherein the telecommunication device is in accordance with a 3GPP telecommunication set of standards and, optionally, with an LTE set of standards.

Clause 36. Circuitry for a telecommunication device communicating data in a wireless telecommunications system, the system comprising a base station and one or more terminals operable to communicate via a wireless interface and in accordance with a mobile communication protocol, the wireless interface being provided by at least a first component carrier within a first frequency band and a second component carrier within a second frequency band, wherein the circuitry comprises a controller element and a transceiver element configured to operate together to:
transmit, from a link control module to an access control layer module, a link control layer Packet Data Unit "PDU" for transmission, the link control layer being at a higher layer than the access control layer;
transmit first access control layer data using resources allocated within the first component carrier, wherein the first access control layer data corresponds to the PDU;
identify that transmission of data for the PDU has been unsuccessful; and
upon identification that transmission of data for the PDU has been unsuccessful, re-transmit, from the link control module, the PDU and cause the re-transmitted PDU to be transmitted via second access control layer data using resources allocated within the second component carrier.

REFERENCES

[1] LTE for UMTS: OFDMA and SC-FDMA Based Radio Access, Harris Holma and Antti Toskala, Wiley 2009, ISBN 978-0-470-99401-6;
[2] 3GPP TS 36.211 version 12.4.0 Release 12;
[3] 3GPP TS 36.212 version 12.3.0 Release 12;
[4] 3GPP TS 36.213 version 12.4.0 Release 12;
[5] 3GPP TS 36.321 version 12.4.0 Release 12;

[6] 3GPP TS 36.331 version 12.4.1 Release 12; and
[7] R2-150188 "Overview of possible LAA impact to RAN2" Nokia Corporation, Nokia Networks (9-13 Feb. 2015).

The invention claimed is:

1. A method of communicating data in a wireless telecommunications system, the system comprising a base station and one or more terminals operable to communicate via a wireless interface and in accordance with a mobile communication protocol, the wireless interface being provided by at least a first component carrier within a first frequency band and a second component carrier within a second frequency band, wherein the method comprises:
   transmitting a link control layer Packet Data Unit "PDU" from a link control module to an access control layer module for transmission, the link control layer being at a higher layer than the access control layer;
   transmitting first access control layer data using resources allocated within the first component carrier, wherein the first access control layer data corresponds to the PDU;
   identifying that transmission of data for the PDU has been unsuccessful;
   upon identification that transmission of data for the PDU has been unsuccessful, the link control module re-transmitting the PDU by transmitting, to the access control layer, (a) the PDU and (b) a retransmission indicator indicating that the PDU relates to re-transmission, wherein the retransmission indicator includes at least information identifying the first component carrier or a type of the first component carrier used for previously attempting to transmit the PDU; and
   upon receipt of the PDU and of the retransmission indicator at the access control layer module, retransmitting the PDU via second access control layer data using resources allocated within the second component carrier.

2. The method according to claim 1, wherein the retransmission indicator includes at least one of: a retransmission flag, a number of unsuccessful attempts for transmitting the PDU, and a carrier or type of carrier for re-transmitting the PDU.

3. The method according to claim 1 wherein transmitting second access control layer data comprises requesting allocation of resources, wherein the resources allocation request comprises at least one of: an identification for the PDU, the retransmission indicator, an indication of the first component carrier as the component carrier for the previous transmission of the PDU and a request for resources on the second component carrier.

4. The method according to claim 1, further comprising:
   upon receipt of a feedback message that at least one attempt to transmit data for the PDU has been unsuccessful, identifying that transmission of the data for the PDU has been unsuccessful.

5. The method according to claim 4, wherein the feedback message indicates that an attempt to transmit the first access control layer data for the PDU has been unsuccessful at least N times, with N≥1.

6. The method according to claim 5, wherein an attempt to transmit the first access control layer data for the PDU is considered as unsuccessful when a negative acknowledgement message is returned in response to the attempted transmission.

7. The method according to claim 4, wherein the feedback message indicates that, following a listen-before-talk procedure, a retransmission of the first access control layer data for the PDU cannot be carried out.

8. The method according to claim 1, wherein, upon expiry of a timer before a positive acknowledgement message is received, the link control module identifies that the transmission of data for the PDU has been unsuccessful.

9. The method according to claim 1, wherein the access control layer is a Media Access Control "MAC" layer.

10. The method according to claim 1, wherein the link control layer is a Radio Link Control "RLC" layer.

11. The method according to claim 1, wherein the first access control layer data is identical to the second access control layer data.

12. The method according to claim 1, wherein
   transmitting the first access control layer data comprises maintaining at the access control module information indicating transmission of the first access control layer data on the first component carrier.

13. The method according to claim 1, wherein
   the wireless telecommunications system implements a carrier aggregation scheme wherein data can be transmitted simultaneously over two component carriers, one of the two component carriers being a primary component carrier and the other of the two component carriers, being a secondary component carrier;
   the first component carrier is a secondary component carrier; and
   the second component carrier is the primary component carrier.

14. The method according to claim 1, wherein the PDU is for downlink transmission.

15. The method according to claim 1, wherein the PDU is for uplink transmission.

16. A telecommunication device for communicating data in a wireless telecommunications system, the system comprising a base station and one or more terminals operable to communicate via a wireless interface and in accordance with a mobile communication protocol, the wireless interface being provided by at least a first component carrier within a first frequency band and a second component carrier within a second frequency band, wherein the telecommunication device comprises:
   a link control module at a link control layer; and
   an access control layer module at an access control layer, the link control layer being at a higher layer than the access control layer;
   wherein the telecommunication device is configured to:
      transmit, from the link control module to the access control layer module, a link control layer Packet Data Unit "PDU" for transmission;
      transmit first access control layer data using resources allocated within the first component carrier, wherein the first access control layer data corresponds to the PDU;
      identify that transmission of data for the PDU has been unsuccessful; and
      upon identification that transmission of data for the PDU has been unsuccessful, re-transmit, from the link control module, the PDU by transmitting, to the access control layer, (a) the PDU and (b) a retransmission indicator indicating that the PDU relates to re-transmission, wherein the retransmission indicator includes at least information identifying the first component carrier or a type of the first component carrier used for previously attempting to transmit the PDU; and upon receipt of the PDU and of the retransmission indicator at the access control layer module, retransmitting the PDU via second access control layer data using resources allocated within the second component carrier.

17. The telecommunication device of claim 16, wherein the telecommunication device is one of a terminal, a base station and a relay node.

18. The telecommunication device of claim 16, wherein the telecommunication device is in accordance with a 3GPP telecommunication set of standards and, optionally, with an LTE set of standards.

19. Circuitry for a telecommunication device communicating data in a wireless telecommunications system, the system comprising a base station and one or more terminals operable to communicate via a wireless interface and in accordance with a mobile communication protocol, the wireless interface being provided by at least a first component carrier within a first frequency band and a second component carrier within a second frequency band, wherein the circuitry comprises a controller element and a transceiver element configured to operate together to:

transmit, from a link control module to an access control layer module, a link control layer Packet Data Unit "PDU" for transmission, the link control layer being at a higher layer than the access control layer;

transmit first access control layer data using resources allocated within the first component carrier, wherein the first access control layer data corresponds to the PDU;

identify that transmission of data for the PDU has been unsuccessful; and upon identification that transmission of data for the PDU has been unsuccessful, re-transmit, from the link control module, the PDU by transmitting, to the access control layer, (a) the PDU and (b) a retransmission indicator indicating that the PDU relates to re-transmission, wherein the retransmission indicator includes at least information identifying the first component carrier or a type of the first component carrier used for previously attempting to transmit the PDU; and upon receipt of the PDU and of the retransmission indicator at the access control layer module, and retransmitting the PDU via second access control layer data using resources allocated within the second component carrier.

20. The circuitry of claim 19, wherein the first component carrier is in an unlicensed licensed frequency band of the wireless telecommunications system, and the access control layer module, upon receipt of the PDU and of the retransmission indicator, is configured to select, as the second component carrier, a component carrier within a licensed frequency band of the wireless telecommunications system.

* * * * *